(12) United States Patent
Uchikawa (10) Patent No.: US 8,149,440 B2
(45) Date of Patent: Apr. 3, 2012

(54) INFORMATION PROCESSING METHOD AND SYSTEM

(75) Inventor: Shinichi Uchikawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1113 days.

(21) Appl. No.: 11/873,294

(22) Filed: Oct. 16, 2007

(65) Prior Publication Data

US 2008/0104035 A1    May 1, 2008

(30) Foreign Application Priority Data

Oct. 30, 2006  (JP) .................................. 2006-294659

(51) Int. Cl.
*G06F 3/12* (2006.01)

(52) U.S. Cl. ...... 358/1.15; 358/1.18; 358/402; 709/204; 709/206

(58) Field of Classification Search ................. 358/1.15, 358/1.18, 1.12, 448, 402–403; 709/204, 709/206, 245, 208
See application file for complete search history.

(56) References Cited

U.S. PATENT DOCUMENTS

| | | | | | |
|---|---|---|---|---|---|
| 4,839,829 | A | * | 6/1989 | Freedman | 715/751 |
| 5,805,298 | A | * | 9/1998 | Ho et al. | 358/402 |
| 6,882,441 | B1 | * | 4/2005 | Faust et al. | 358/1.18 |
| 7,016,865 | B1 | * | 3/2006 | Weber et al. | 705/26.5 |
| 7,206,812 | B2 | * | 4/2007 | Kogure et al. | 709/206 |
| 7,394,560 | B2 | * | 7/2008 | Tonegawa | 358/1.15 |
| 7,636,757 | B2 | * | 12/2009 | Kemp et al. | 709/208 |
| 7,672,003 | B2 | * | 3/2010 | Dowling et al. | 358/1.15 |
| 7,746,496 | B2 | * | 6/2010 | Henry et al. | 358/1.15 |
| 7,817,295 | B2 | * | 10/2010 | Henry et al. | 358/1.15 |
| 7,991,828 | B2 | * | 8/2011 | Shinomiya | 709/203 |
| 8,045,204 | B2 | * | 10/2011 | Henry et al. | 358/1.15 |
| 2002/0051221 | A1 | * | 5/2002 | Wakabayashi | 358/402 |
| 2002/0099778 | A1 | * | 7/2002 | Kogure et al. | 709/206 |
| 2003/0123079 | A1 | * | 7/2003 | Yamaguchi et al. | 358/1.15 |
| 2007/0236732 | A1 | * | 10/2007 | Henry | 358/1.15 |

FOREIGN PATENT DOCUMENTS

| | | |
|---|---|---|
| JP | 06-075725 A | 3/1994 |
| JP | 9-321894 A | 12/1997 |
| JP | 2001-109693 A | 4/2001 |
| JP | 2002-318669 A | 10/2002 |
| JP | 2006-080730 A | 3/2006 |

OTHER PUBLICATIONS

Office action issued in corresponding Japanese Patent Application No. 2006-294659 dated Aug. 22, 2011.
OA issued Nov. 21, 2011 for corresponding JP2006-294659.

* cited by examiner

*Primary Examiner* — Negussie Worku
(74) *Attorney, Agent, or Firm* — Rossi, Kimms & McDowell LLP (57) ABSTRACT

There is disclosed a technique that facilitates a search for a service and use of the service available on a network. To accomplish this, steps of inputting information about a service (S100 to S102) and steps of searching a network for service providing devices capable of implementing the service about which information has been input (S103 and S104) are to be executed. Then, service providing devices found by the search are displayed (S105), a service providing device that executes the service is selected from among the multiple service providing devices displayed (S106) to cause the service providing device to execute the service about which information has been input at in the inputting step (S107).

12 Claims, 9 Drawing Sheets

INFORMATION PROCESSING METHOD AND SYSTEM

BACKGROUND OF THE INVENTION

1. Field of the Invention

The present invention relates to a technique of searching for a service available on a network.

2. Description of the Related Art

Searching for a service available on a network is commonplace these days. When a user wants to search a network for a service, the user specifies the type or features of the services as search criteria and causes a search engine to search for the service (Japanese Patent Laid-Open No. 2001-109693).

However, conventional service searches are not easy to use because setting search criteria is complicated. For example, when a user wants to search for a service that sends data to particular destinations, the user must check the destinations to which the user wants to send and specify a data transmission method from among many data transmission methods such as G3-FAX, G4-FAX, iFAX, IP-FAX, SMB, FTP, and WEB-DAV for each of the destinations.

A service that transmits data using the same G3-FAX or G4-FAX protocol may use a device that permits only transmission to domestic destinations and a device that permits transmission to both domestic and foreign destinations. Therefore, it is very unfriendly and tricky for a user to specify service search attributes.

The flow of operations performed by a user to use a service on a network is very inefficient. For example, when a user wants to perform color facsimile transmission, the user specifies search attributes like "Type of service"="Transmission service", "Transmission method"="G3-FAX", "Color transmission"="Support", and "Destination"="Overseas" to perform a search for a service. Then the user specifies a device on a list of service providing devices searched. In addition, the user must make settings such as "Reading mode=Color", "Transmission method=G3-FAX", "Recipient's phone number (for international transmission)" to issue a request for processing to a service providing device. In sum, to use a service, the user must provide inputs for searching for the service and inputs for executing the service. Thus, the use of a service requires considerably redundant operations.

SUMMARY OF THE INVENTION

The present invention enables to provide a technique that allows a user to readily search for a service on a network and presents the result of the search to the user.

According to one aspect of the present invention, the foregoing problem is solved by providing an information processing method comprising inputting information about a service, searching a network for a service providing device capable of implementing the service about the input information, displaying the searched service providing devices, and selecting a service providing device that performs the service from the displayed service providing devices to cause the service providing device to perform the service about the input information.

According to another aspect of the present invention, the foregoing problem is solved by providing an information processing system comprising an input unit configured to input information about a service, a search unit configured to search a network for a service providing device capable of implementing the service about which information is input in the input unit, a display unit configured to display service providing devices found by search in the search unit, and a service executing unit configured to select a service providing device that performs the service from the service providing devices displayed on the display unit to cause the service providing device to perform the service about which information has been input in the input unit.

According to still another aspect of the present invention, the foregoing problem is solved by providing a computer executable program stored in a computer readable storage medium comprising a code to input information about a service, a code to search a network for a service providing device capable of implementing the service about the input information, a code to display the searched service providing devices and a code to select a service providing device that performs the service from the displayed service providing devices to cause the service providing device to perform the service about the input information.

Further features of the present invention will become apparent from the following description of exemplary embodiments with reference to the attached drawings.

DESCRIPTION OF THE EMBODIMENTS

A preferable embodiment of the present invention will be described in detail below by way of example with reference to the accompanying drawings. Components described with respect to the embodiment are just illustrative and are not intended to limit the scope of the invention.

Premise Technique

Figure 4:
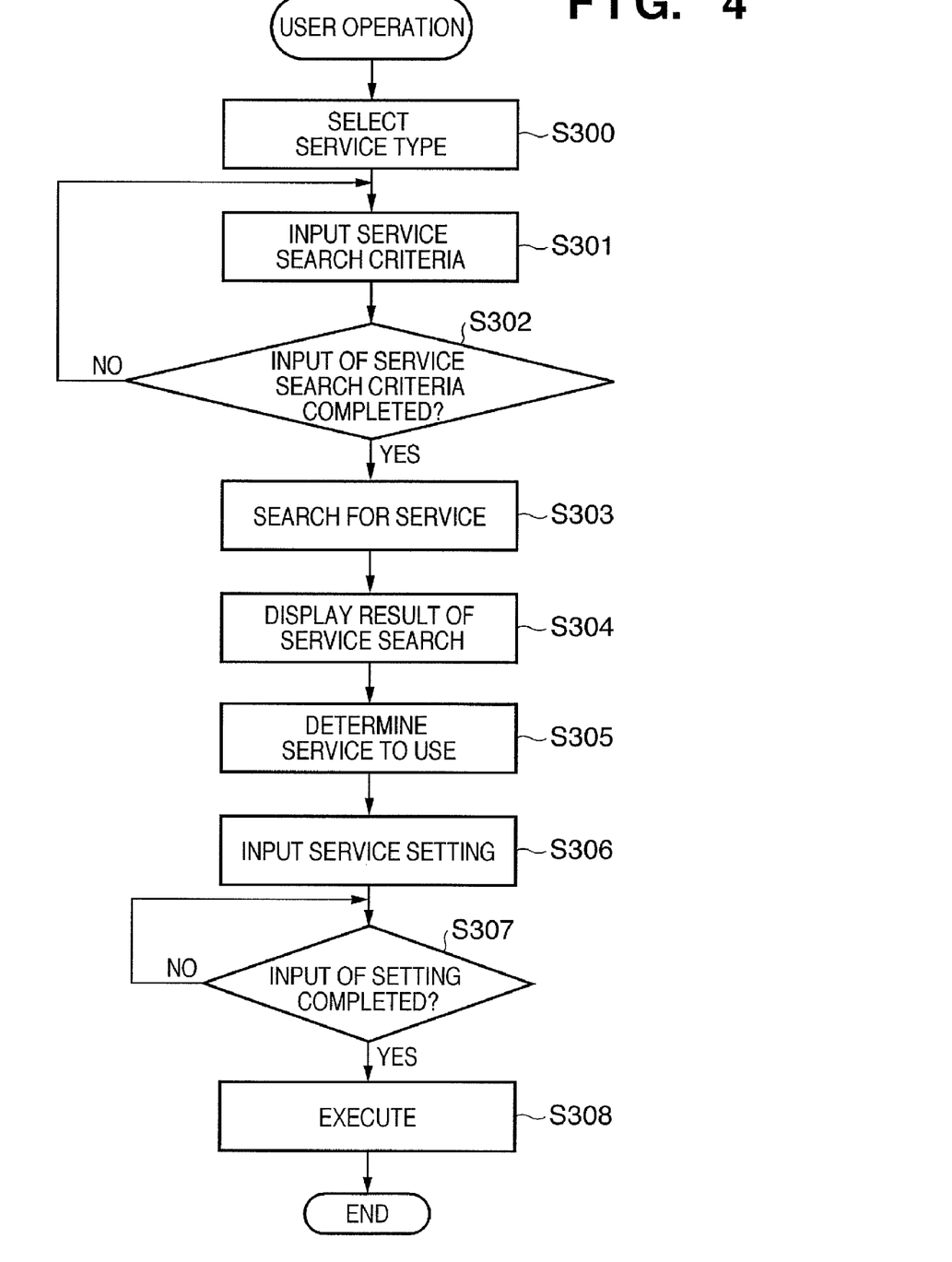
FIG. 4 is a flowchart of a conventional method for using a service.

A technique on which the present invention is premised on will be described first with respect to FIGS. 4 and 5. FIG. 4 is a flowchart showing a procedure for using a network service. First, the type of a service to use is selected at S300. After a service type is selected, the process proceeds to step S301, where service search criteria corresponding to the type of the service is input.

The user inputs all search criteria for the service in step S301. Upon completion of the input, the process proceeds from step S302 to S303, where a service search is performed. Specifically, a service search is performed based on the service search criteria set at S301 and the service type selected at S300 and the result of the search is displayed in step S304. From the result of the search displayed at S304, the user chooses a service to be utilized (S305). Then, the user inputs settings required for using the service (S306). After all inputs of settings are completed (S307), if the user selects execution, a processing request is sent to the service and processing is executed (S308).

Figure 5:
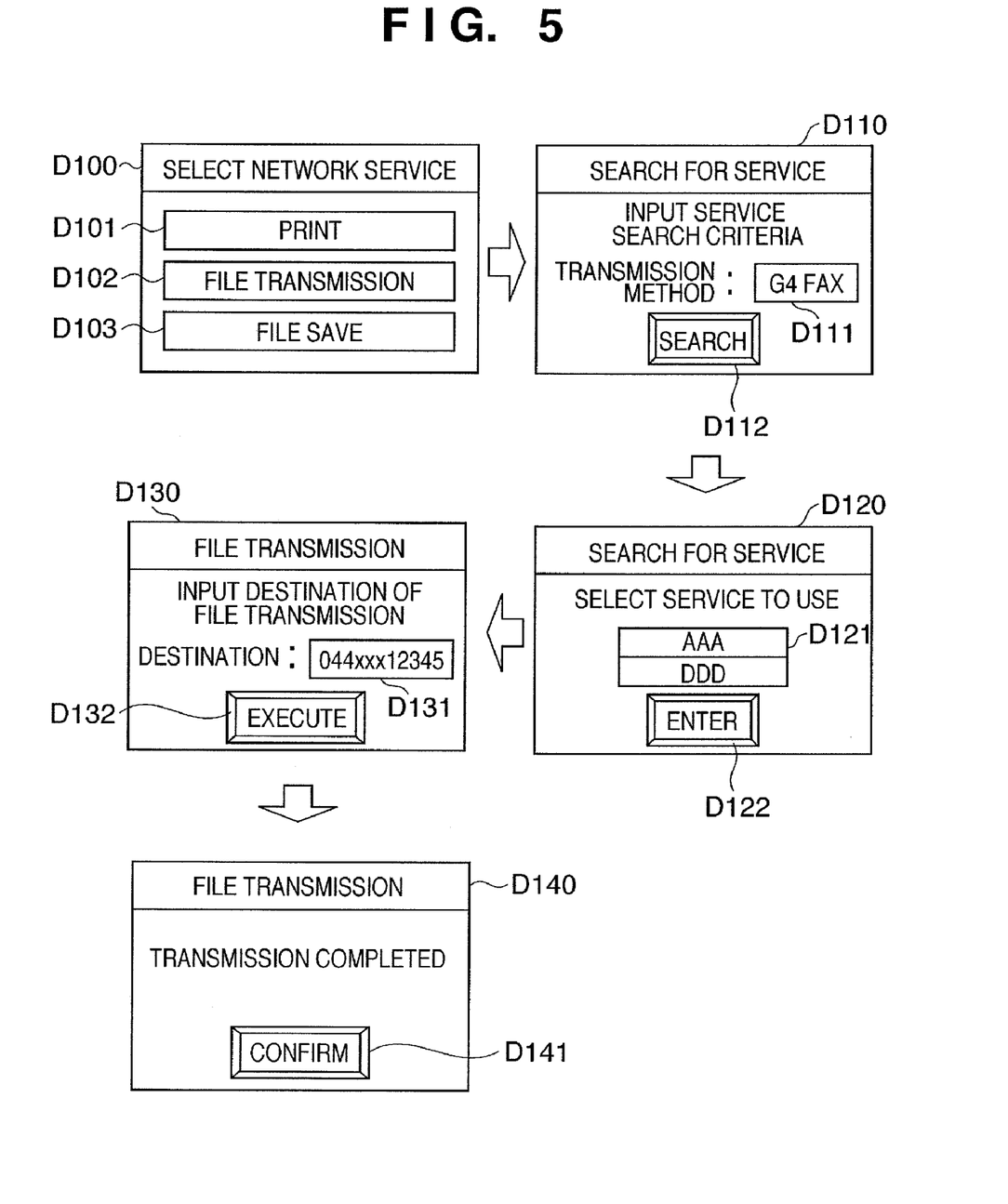
FIG. 5 is a diagram showing a conventional procedure for using a service.

FIG. 5 is a flowchart showing transition of a UI screen for using a network service. This is a UI screen flow on a service search apparatus 100, which will be described later with respect to FIG. 3. When a user operating unit 1008 accepts selection of a network service from a user, a display unit 1009 displays a screen D100 to accept selection of a service to use. For example, "Print" D101, "Transmit file" D102, or "Save file" D103 button can be selected in D100. "Print" D101 is a service that transfers scan data to a printer on a network to output the data. "File transmission" D102 is a service that transfers data to a file transfer service on the network to transfer the data to an intended file receiving system. "File save" D103 is used for transferring data to a storage service on the network to delegate storage and management of the data to the storage service or obtain managing data of the storage service. These displays are presented regardless of whether or not the service search apparatus 100 itself has printing capability, file transmission capability, and file storing capability. When "File transmission" D102 is selected in the UI screen D100, the UI screen transitions to UI screen D110.

A UI screen D110 is a screen for inputting a search criterion for performing a service search. "G4-FAX" is input in a transmission method input box D111 as an example in the screen D110. That is, a criterion is input so that a file transmission service that uses "G4-FAX" as a transmission method is searched for. Multiple service search criteria may be input. When a service search button D112 is selected after inputting the service criterion, a UI screen D120 is displayed. The result of service search based on the service search criterion set in the UI screen D110 is displayed in this screen.

Here, a service AAA and a service DDD found as a result of the search are displayed on a search result list D121. The user selects one of the services on the search result list that the user wants to use and then presses an enter button D122.

A UI screen D130 is a screen for inputting a service use setting item for requesting a selected service AAA to perform processing. This screen contains a field D131 for inputting a telephone number of the destination of a facsimile. In this example, "044xxx12345" is input. When information required for using a service AAA is input and an execute button D132 is pressed, a request for processing is provided to the service AAA and a UI screen D140 is displayed. This is a screen that displays the result of a processing request sent to the service AAA. In this example, the screen displays a message indicating that transmission has been successfully completed. A confirmation button D141 is provided in the screen in order to make the user aware of the result of processing. Pressing the button will complete the process for using the service. The destination can be specified by directly inputting the telephone number of the destination, or by using an address book in which a recipient's name and phone number and a transmission method can be associated with each other and stored. The address book may be held by the service search apparatus 100 itself or by an external apparatus.

First Embodiment

Figure 1:
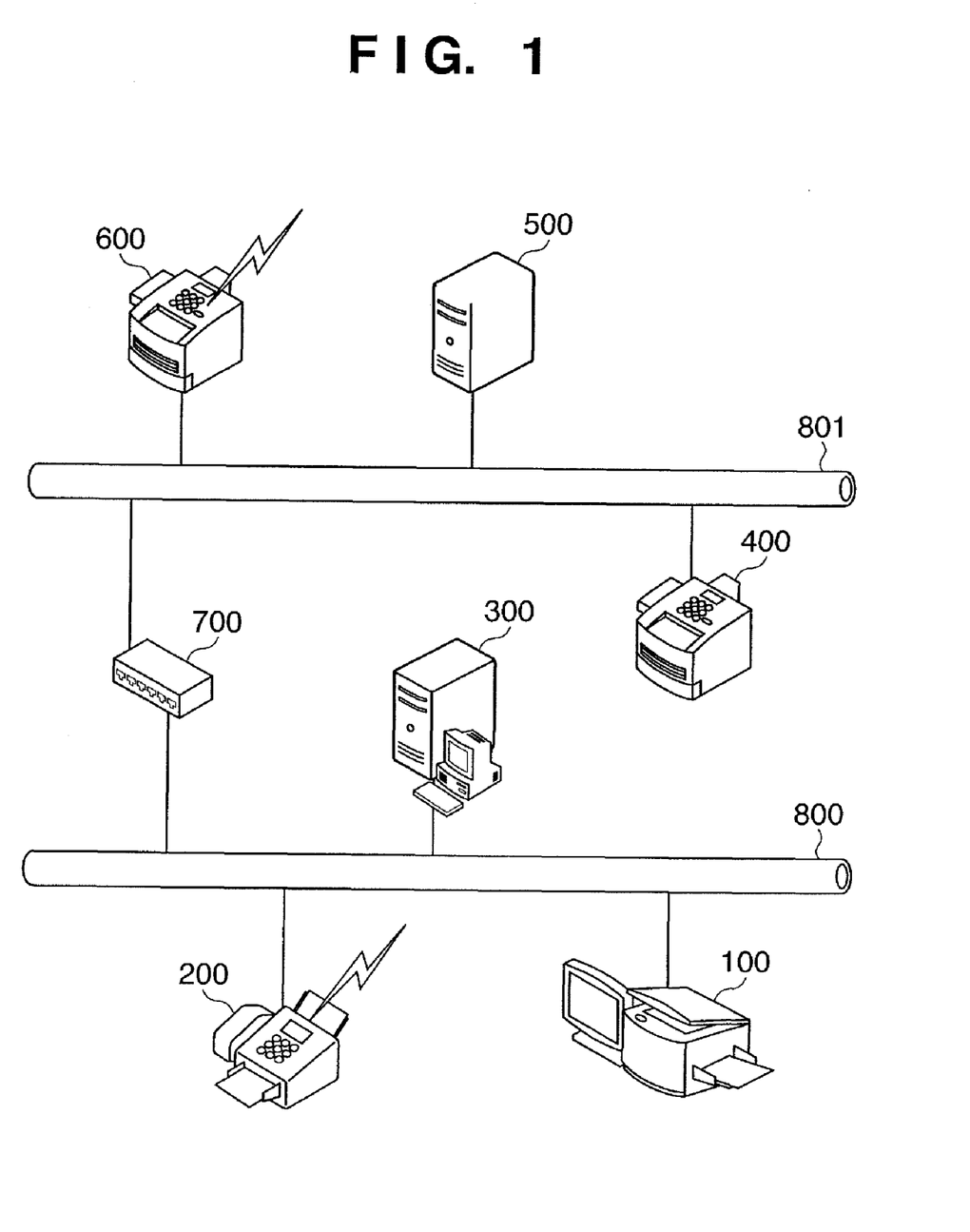
FIG. 1 is a diagram showing a system configuration to which a service search apparatus according to an embodiment of the present invention can be applied.

FIG. 1 shows an exemplary system configuration according to a first embodiment of the present invention. Reference numeral 100 denotes a service search apparatus which includes a mechanism for searching external services and client programs for using external services. Reference numeral 200 denotes a device including a telephone-line facsimile service that can be utilized from a client system on a network. The device 200 includes a service that uses a fixed-telephone line compliant with a facsimile standard, such as G3-FAX or G4-FAX, that conforms to ITU-T recommendations, and a monochrome print service. Reference numeral 300 denotes an information management server, which implements a service that the server receives particular information and returns information relating to the information. Reference numeral 400 denotes a printer which provides a color print service. Reference numeral 500 denotes a storage service, which stores and manages a document transmitted to it. Reference numeral 600 denotes a device that transmits data. The device 600 is capable of implementing G3-FAX and G4-FAX services and iFAX service (Internet FAX compliant with ITU-T.37 standard) which uses a network. The device 600 is also capable of implementing electronic mail transmission that uses a transmission method other than iFAX, and IP-FAX (facsimile using VoIP), SMB file transmission, FTP file transmission, and WEBDAV file transmission services. The device 600 is also capable of color print. Reference numeral 700 denotes a router to which networks 800 and 801 are connected.

Figure 2:
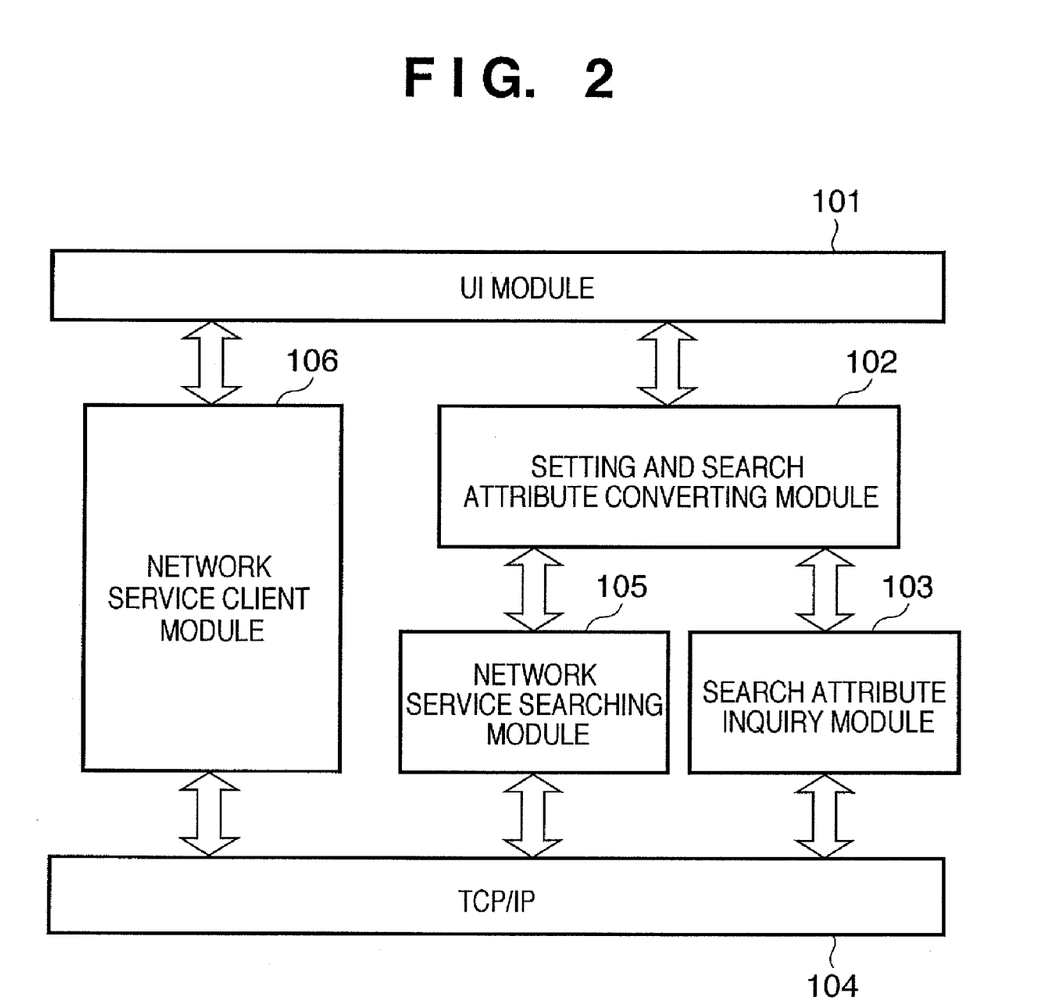
FIG. 2 is a module configuration diagram showing a software configuration of the service search apparatus according to the embodiment of the present invention.

FIG. 2 is a block diagram showing internal modules of the service search apparatus 100. Reference numeral 101 denotes a UI module which presents information about a device to a user and is also used for being notified of an instruction from the user. Reference numeral 102 denotes a module that analyzes information set by a user and generates service search criteria based on the information. The module 102 sets search criteria by itself or by using a search attribute inquiry module 103. The search attribute inquiry module 103 inquires specified setting information from a server on a network to obtain information that can be used as a service search attribute. Reference numeral 104 denotes a network protocol stack which is a module having the capability of transmitting and receiving data to and from a network. Reference numeral 105 denotes a network search module which searches for a service on a network by using a search attribute converted by the setting and attribute converting module 102. Reference numeral 106 denotes a client module for using a service on a network. The client module 106 uses information based on setting information indicated by the UI module 101 to use a network service.

The service search apparatus 100 in the configuration described above uses its display unit 1009 and the user operating unit 1008 to allow a user to select a service such as print, file transmission, or file save. The service search apparatus 100 then allows the user to specify specific service (such as the path to a file to be printed, the type of printer, paper size, the destination to send file, and the destination to save file). Based on information about a service thus input, a device that provides such a service is searched for among various devices on a network. The service search apparatus displays the result of the search on the display unit 1009, thereby presenting the search result to the user to prompt the user to select a service providing device from among the presented devices that should actually provide the service. Then, the service search apparatus 100 uses the information input for the previous search to request the selected service providing device (for example FAX200) to provide the service (for example facsimile transmission).

Figure 3:
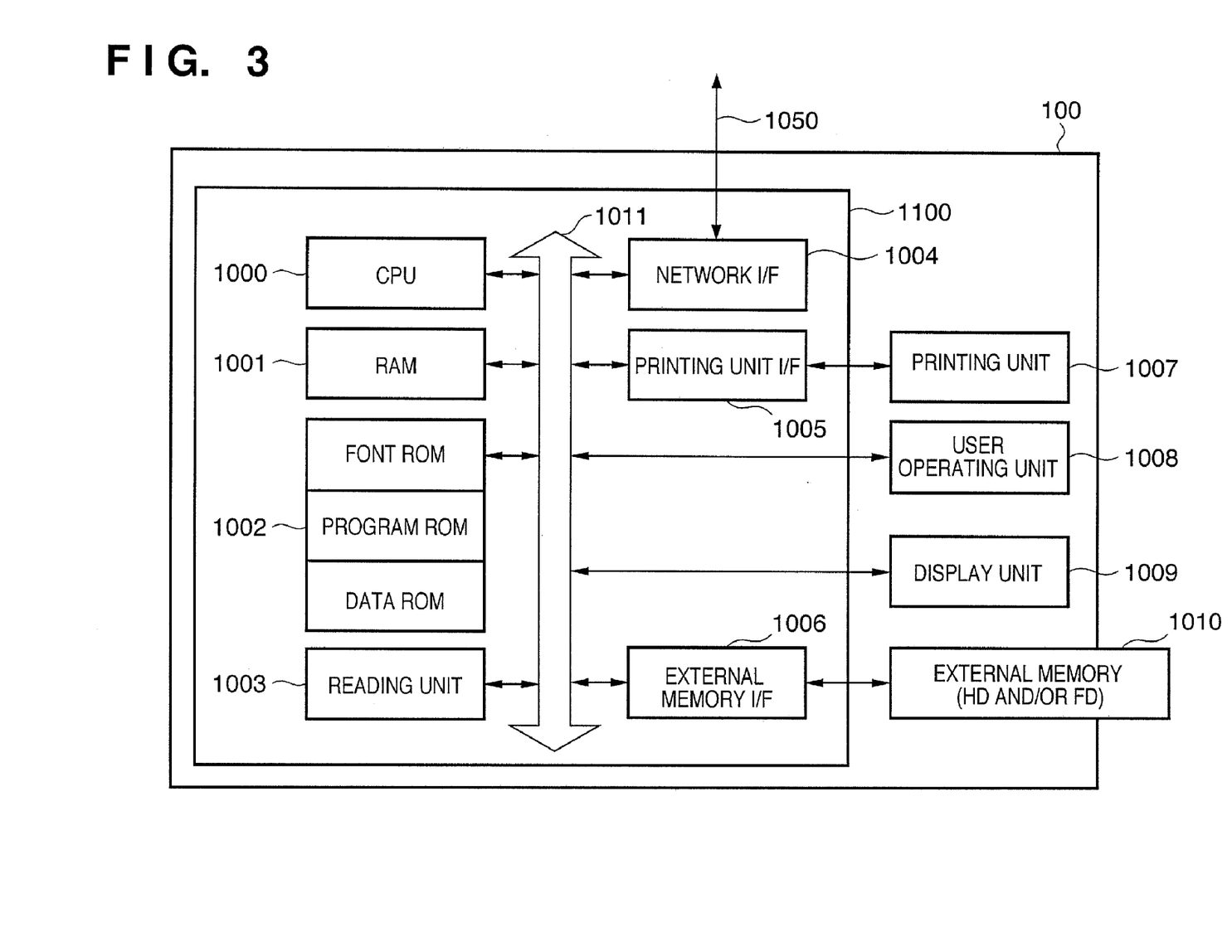
FIG. 3 is a diagram showing a hardware configuration of the service search apparatus according to the embodiment of the present invention.

FIG. 3 shows an internal configuration of the service search apparatus 100. Reference numeral 1000 denotes a central processing unit (CPU) which controls the entire apparatus in accordance with a control program stored in a program ROM of a ROM 1002 or a control program stored in an external memory 1010. The CPU 1000 also reads an image from an original through a reading unit 1003 connected onto a system bus 1011 and generates image data representing the image. A color reading mode and a monochrome reading mode are provided. In the color reading mode, an original is decomposed into color components to output color image data. In the monochrome reading mode, monochrome image data according to brightness is output. The CPU 1000 also outputs an image signal as output information to a printing unit (printer engine) 1007 through a printing unit interface 1005 connected onto the system bus 1011. The printing unit 1007 prints an image according to the image signal on recording paper. The program ROM of the ROM 1002 stores programs such as a control program which controls the CPU 1000. A font ROM of the ROM 1002 stores font data used for generating the output information mentioned above. If no external memory 1010 such as a hard disk is provided, a data ROM of the ROM 102 stores information used on a client device and other information.

The CPU 1000 is connected to a network through a network interface 1004 and can perform communication processing with a client device 300 so that the CPU 1000 can notify the client device 300 of information contained in the apparatus and the like. Reference numeral 1001 denotes a RAM which functions as a main memory and a work area for the CPU 1000. The memory capacity of the RAM 1001 can be expanded by using an optional RAM connected to an expansion port, not shown. The RAM 1001 is used for, for example, an output information load area, an environmental data storage area and NVRAM. The display unit 1009 provides various kinds of information to a print service user. Access to an external memory 1010 such as a hard disk (HD) or an IC card is controlled by an external memory interface 1006. The external memory 1010 is optionally connected and stores font data, an emulation program, form data and the like. The user operating unit 1008 is an operation panel on which operating switches and LED indicators and the like are arranged. The service search apparatus 100 includes at least one or more external memories described above and may be configured so that multiple external memories can be connected such as an optional font card that stores fonts other than built-in fonts and external memories that store programs interpreting different types of printer control languages. Furthermore, the service search apparatus 100 may include an NVRAM, not shown, for storing mode setting information provided from the user operating unit 1008.

Figure 6:
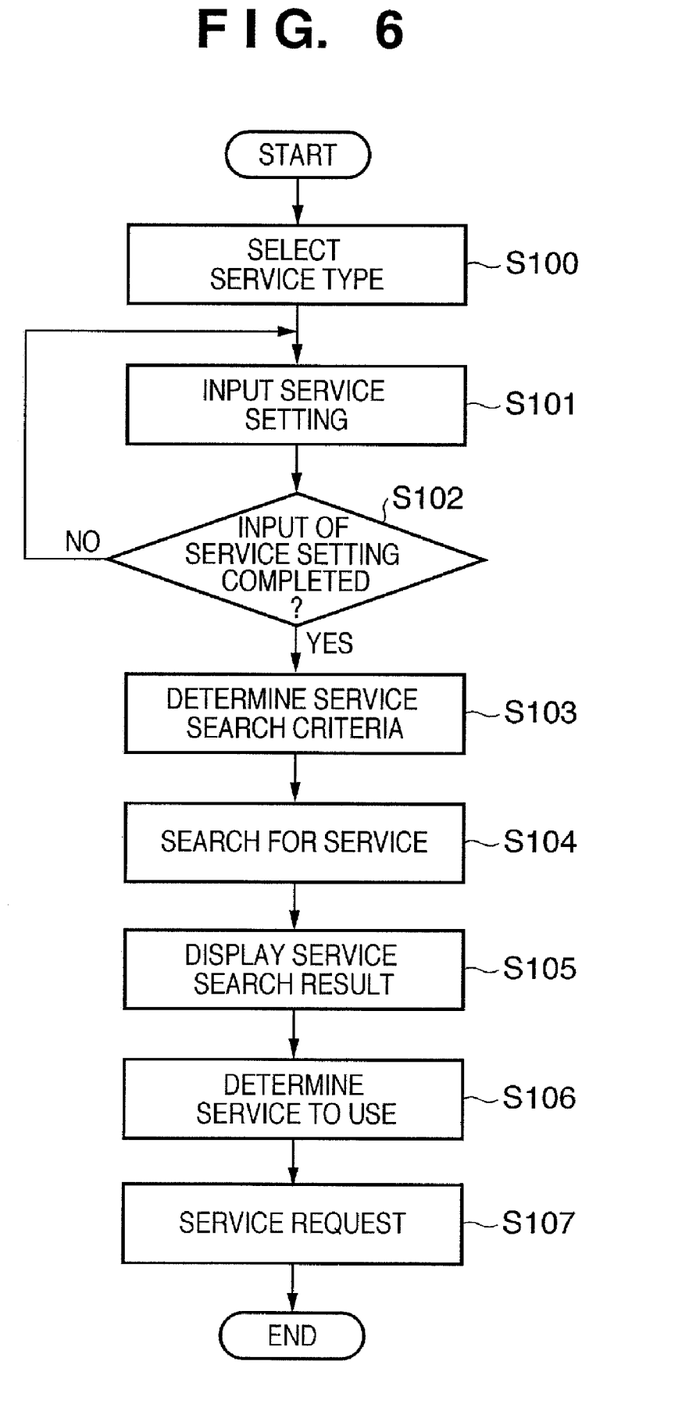
FIG. 6 is a flowchart of a method for using a service, performed in the service search apparatus according to the embodiment of the present invention.
Figure 8:
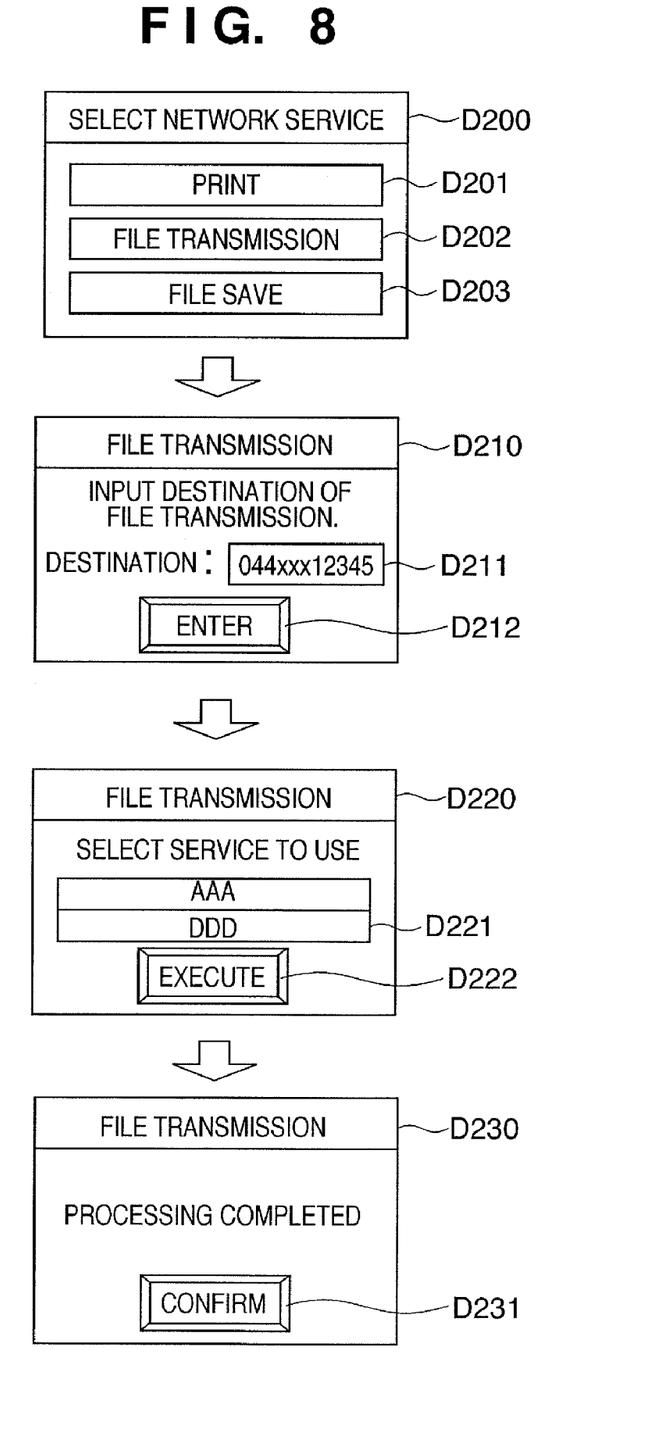
FIG. 8 is a diagram showing a procedure for using a service, performed in the service search apparatus according to the embodiment of the present invention.

FIG. 6 is a flowchart showing a flow of a process for searching for a network service using the service search apparatus 100. First, the type of a service to use is input in step S100. In particular, a screen D200 shown in FIG. 8 is displayed on the display unit 1009 to prompt the user to select a service type.

When a service type is selected, a screen D210 is displayed to prompt the user to input settings required for using the service (S101). After all settings required for using the service are input in step S101, the service search apparatus 100 judges the service the user wants to use and determines (S103) search criteria on the basis of the service type selected in step S100 and the settings required for using the service input in step S101. A search attribute conversion table indicating association between search attributes required for the search and setting items required for using services is provided in the ROM 1002 or an external memory 1010 and a search attribute is determined based on the settings input at S101. Then, the service is searched for by using the determined search criteria (S104) and a screen D220 is displayed to present the result of the search to the user (S105). When a service (service providing device) the user wants to use is determined from the search result displayed in step S105 (S106), the process proceeds to step S107, where the service providing device is requested to execute the service determined based on the settings input in S101. Because the settings input in S101 are directly used as information about the service requested from the service providing device, the user does not need to input the information here again. However, the settings may be modified to the extent that the service providing device can execute, depending on the result of the search.

A service can be searched for on a network in various ways. For example, a multicast or broadcast technique such as SLP, SNMP, WS-Discovery, UPnP, BMLINKS, DLNA, DNS-SD, or SSDP may be used.

Figure 7:
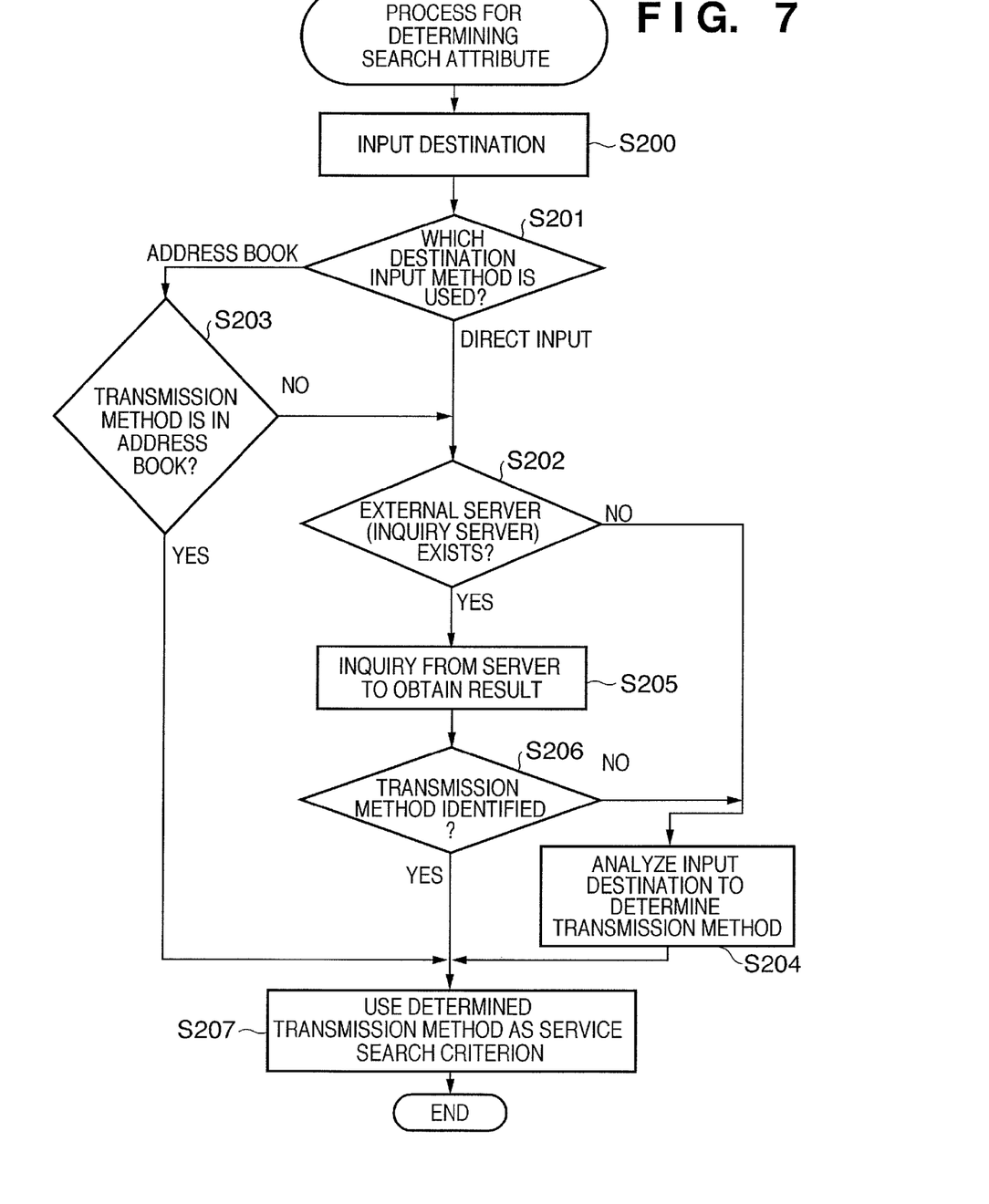
FIG. 7 is a flowchart of a process for searching for a service, performed by the service search apparatus according to the embodiment of the present invention.

FIG. 7 is a flowchart showing a process for searching for a file transmission service as an example of a process for determining a network service search attribute, shown at S103 of FIG. 6. The process shown in the flowchart is performed by the setting and search attribute converting module 102 and the UI module 101 in FIG. 2.

A file transmission service search attribute conversion table stored in the ROM 1002 or external memory 1010 and used by the search attribute converting module 102 for conversion contains information for making the following determinations.

If a destination is (directly) input stroke by stroke through a keyboard of the user operating unit 1008, the input destination is a telephone number. If "G3" is specified on the user operating unit 1008, it is determined that "G3-FAX" is the transmission method search attribute; if "G4" is specified, it is determined that "G4-FAX" is the transmission method search attribute. IP-FAX also allows a telephone number to be used for transmission. Therefore, if a telephone number is input and IP-FAX is specified, it is determined that "IP-FAX" is a search attribute. If a telephone number (consisting only of numeric characters) is input in this way, the CPU 1000 determines first that the search attribute is one of G3-FAX, G4-FAX, and IP-FAX. Then the CPU 1000 displays them as candidate search attributes on the display unit 1009 to allow the user to select one.

If G3-FAX is the only service in the system that can perform a transmission method that uses a telephone number, it may be determined that G3-FAX is the transmission method, on the sole condition that a telephone number is input. If G3-FAX and G4-FAX are the transmission methods that use a telephone number, it may be determined that both G3-FAX and G4-FAX are search attributes.

In the case of facsimile transmission using PSTN or ISDN, only certain devices may be permitted to perform international communication. Therefore, when facsimile transmission is performed, information must be added that indicates whether the transmission is overseas or it is a domestic facsimile transmission. If an input telephone number includes a country code or a number for international communication, it is determined that the transmission is an overseas transmission and a search attribute, "International transmission" is added.

If an input destination is a path to a folder and SMB file transmission is specified, it is determined that "SMB file transmission" is the transmission method search attribute. If FTP file transmission is specified, it is determined that "FTP file transmission" is the transmission method search attribute. If WEBDAV file transmission is specified, it is determined that "WEBDAV file transmission" is the transmission method search attribute. Again, if a destination is the path to a folder, the CPU 1000 may determine that a candidate of transmission method is one of SMB file transmission, FTP file transmission, and WEBDAV file transmission, and may display them on the display unit 1009 to allow the user to select one.

If an input destination is an electronic mail address (a character string including "@") and iFAX is specified, it is determined that "iFAX" is the transmission method search attribute. If electronic mail is specified, it is determined that "electronic mail" is the transmission method search attribute. Again, if the destination is an electronic mail address, the CPU 1000 may first determine that the candidate transmission method is iFAX or electronic mail and display them on the display unit 1009 to allow the user to select one. Furthermore, whether data should be transmitted as iFAX or not can be determined based on the format of a file attached to electronic mail. Therefore, under the condition that TIFF and a resolution and encoding format used for facsimile are selected as the file format when a reading mode for an original is specified, which will be described later, it may be determined that iFA is the transmission method search attribute; otherwise, it may be determined that electronic mail is the transmission method.

Furthermore, in the present embodiment, an address can be input by selecting from an address book. Attributes of transmission methods are associated and stored with address information in the address book. When an address is selected, the transmission method attribute associated with the address is used as a search attribute.

An additional search attribute is determined based on a reading mode used by the reading unit 1003 for reading an original.

In particular, when an instruction is issued from the user operating unit 1008 to the reading unit 1003 to read an image on an original in color reading mode, "Color" is added as a search attribute. For monochrome reading mode, "Monochrome" is added as a search attribute or no search attribute is added here (because a device having color reading capability is also capable of monochrome reading).

Furthermore, when a file format of image data obtained by reading an image on an original by the reading unit 1003 is specified, the specified file format is added as a file format search attribute. Here, a file format can be selected from among TIFF, PDF, JPEG, BMP and the like.

Other search attributes are determined based on information about various operations input for transmission. Image data to be transmitted is not limited to image data obtained through the reading unit 1003. Image data stored in an external memory 1010 and the like can also be transmitted.

In the flowchart of FIG. 7, when file transmission is selected at S200 and it is determined that input information is a destination, the process proceeds to step S201, where the input method is determined. If the destination has been input using an address book, the process proceeds from step S201 to S203. On the other hand, if the address has been directly input without using an address book, the process proceeds to S202. In step S203, the address book is searched to determine whether a transmission method is associated with the input destination. If a transmission method is stored in the address book as attribute information associated with the input destination, it is determined that the transmission method is a service search criterion (S207) and then the process will end. The transmission method here may be SMB, FTP, WEBDAV, IP-FAX, iFAX, G3-FAX, G4-FAX, or the like. If such a transmission method is not found in the address book data, the process proceeds to step S202 and the same process sequence performed when the address is directly input is performed.

In step S202, determination is made as to whether a transmission method can be determined from the destination information input in step S200. In particular, determination is made as to whether there is an external server from which destination information can be inquired. If such an external server is set, the destination information is inquired from the server. Examples of such a server include service systems that manage data of directory servers such as VoIP Gatekeeper, SIP server, and LDAP, and.

If a server from which the destination can be inquired is found, an inquiry is made from that server (S205). If a transmission method is identified as a result of the inquiry, the process proceeds from step S206 to step S207, where the identified transmission method is used as a service search criterion. The server determines a transmission method search attribute by using the method described above. If a server from which an inquiry can be made is not found, or if a transmission method cannot be identified through an inquiry from a server, the process proceeds to step S204, where a transmission method is determined.

In step S204, the input destination is analyzed to determine a transmission method. Here, the method described above is used to determine a transmission method search attribute. For example, if a telephone number is input, it is determined that one of facsimile transmission methods that uses a telephone line, namely G3-FAX and G4-FAX, is the transmission method. If an e-mail address is input, it is determined that I-FAX or electronic mail is the transmission method. If a URI is input, it is determined that the transmission method specified by the URI is the transmission method to use. Details of this have been described above. At S207, search attributes determined by the search attribute converting module 102 based on operations by the user, including the transmission method determined as described above, are used as service search criteria to issue a search instruction.

FIG. 8 shows exemplary screens for using network service. The screens are UI screens for using a data transfer service. The term data transfer service refers to a service that, on the service search apparatus, searches a network for a service providing device that is capable of performing a service desired by a user and transfers data from the service search apparatus to a searched service providing device to cause the service providing device to perform the desired service. The display process shown here is performed by the UI module shown in FIG. 2. First, a user selects a network service on the apparatus and then selects a service to use on a screen D200. For example, one of "Print" D201, "File transmission" D202, and "File save" buttons can be selected from screen D200. When "File transmission" D202 is selected from the UI screen D200, the UI screen changes to D210.

A UI screen D210 represents a screen in which a setting item for a transmission service is input. The screen contains a destination input field D211. In this example, a destination, "044xx12345" is input. While only the screen for inputting a destination is shown here, the screen is changed as required to allow the user to specify a reading mode or file format as well other than the input of destination as described above. After all settings for using the service are input in the screen, the user depresses a button D212 for the process to proceed to the next screen. The service search apparatus 100 then searches for the service requested by the user based on the input settings for using the service and presents a list of available services D221 in the UI screen D220 to the user. Here, under the condition that the destination of file transmission has been a telephone number, it is determined that the file transmission is data transmission by facsimile using a telephone line. It is assumed here that a service is a "File transmission" service and supports "G3-FAX" or "G4-FAX" as the transmission method is searched for. When a file transmission service is searched for, a data transfer protocol used for the data transmission is derived from destination information specified by the user and the data transfer protocol is used as a search criterion. Of course, any of the various examples for determining search criteria described above may be used.

After the search is performed in response to the search request, a service list D221 indicating the result of the search is displayed. When the user selects Service AAA or Service DDD presented on the service list D221 and presses an enter button D222, a service request is sent to the selected service providing device. It is assumed here that Service DDD is selected. The services presented here may be a list of service providing apparatuses or service names (such as "G3-FAX service") that can meet the search request. In the latter case, the device that provides a service is invisible to the user but the service search apparatus identifies the service providing device and transfers data (for example image data from the reading unit 1003) to the device.

A UI screen D230 is a screen that displays the result of processing of request issued for Service DDD. In this example, a message indicates that the processing has been successfully completed. A confirmation button D231 is provided for making the user aware of the result of the processing. By pressing this button, the process for using the service will end.

Figure 9:
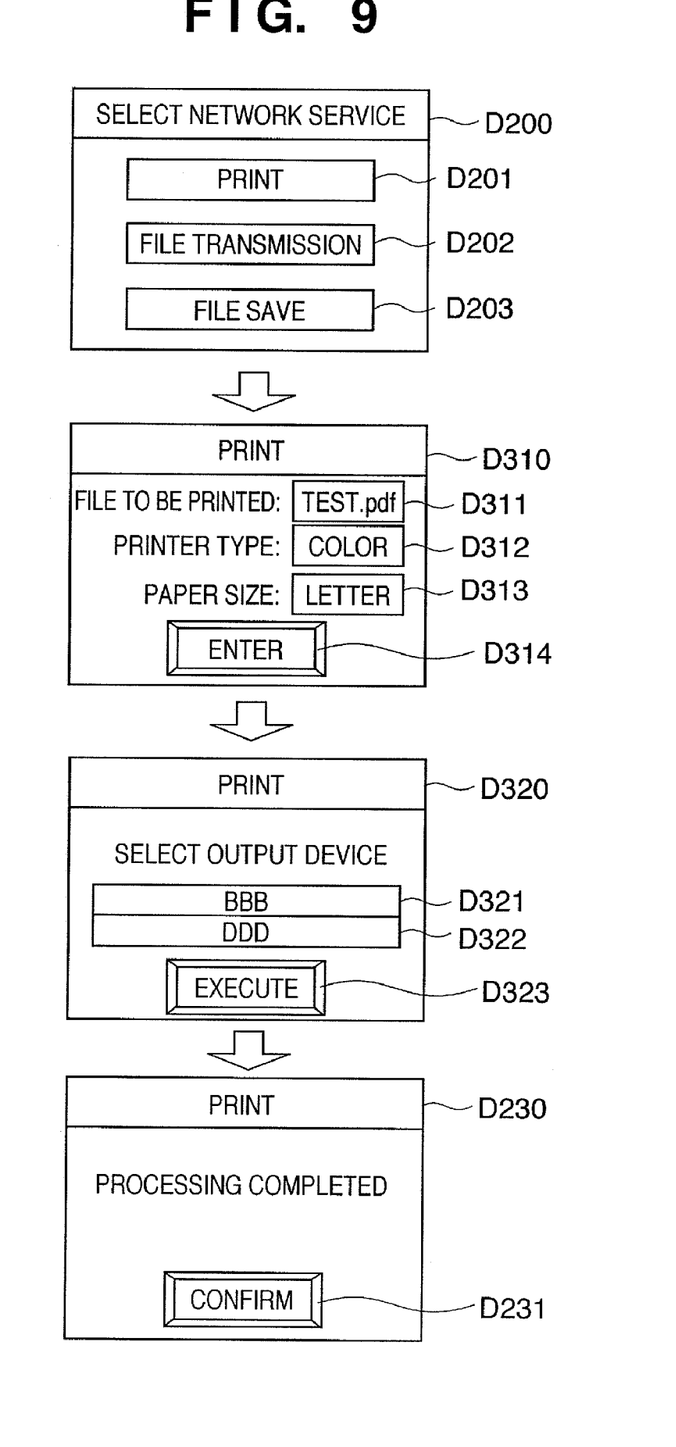
FIG. 9 is a diagram showing a procedure for using a service, performed in the service search apparatus according to the embodiment of the present invention.

FIG. 9 shows another example of the screen for using a network service. The screen is a UI screen for using a data transfer service.

When a request for a network service is received, a screen D200 is displayed for allowing a user to select a service to use. In D200, "Print" D201, "File transmission" D202, or "File save" D203 buttons can be selected. When "Print" D201 is selected, UI screen changes to D310.

The UT screen D310 represents a screen for inputting a setting item for using a print service. The screen contains a field for setting file information to output. In this example, a file having an extension, PDF, is specified. Also, "Color" is specified as the type of printer in a field D312 and "Letter" is specified as the paper size to be output in a field D313. After inputting all settings for using the service in the UI screen D310, the user depresses a button D314 to proceed to the next screen. Then, the service search apparatus 100 searches for the service requested by the user based on the input settings for using the service and presents a list of available services in the UI screen to the user. Since a PDF file has been specified as the file to be printed in this example, a service that is capable of direct printing of PDF and outputting color prints, and supports letter size paper is searched for. In this way, the format of a file to be printed, color or monochrome print, and print paper size specified by the user are used as search criteria when searching a print service.

When the user selects one of Service BBB and Service DDD to use presented on a service list S221 as the result of the search and presses a process execution button D322, a service request is sent along with the setting information set in the screen. If Service DDD is selected, a UI screen D230 is displayed. A confirmation button D231 is provided in the screen in order to make the user aware of the result of the processing. With the depression of this button, the process for using the service will end.

As has been described above, according to the system, a user selects a service type to use and inputs setting information for using the service. Then the system generates service search criteria based on the information input by the user, searches for a service available on a network, and presents the result of the search to the user. The user selects a service to use from the service list presented and sends a process request to the service by using the set criteria. Then the process is completed. Therefore, the user does not need to consciously perform a service search. Furthermore, because the system automatically set complicated search criteria that users should desirably not be conscious of, a user who does not have good knowledge can readily find and use a system. Another advantage of the system is that the number of user operation flow steps can be reduced.

In FIG. 7, setting information specified by the user on the service search apparatus is used to make an inquiry from an external system, or is converted to appropriate service search attributes within the service search apparatus and used.

Even if it is premised that inquiry is made from an external system, a search history (cache information) held in the service search system 100 may be searched for a service.

A service registry that manages services on a network may be searched for a service. The service registry may be a UDDI server or SLP proxy server, for example.

When a telephone number is used for transmission, an international communication number or area code of a destination may be identified to determine a search criterion for identifying a low-communication-charge service.

Some service providing devices may limit access to certain users. Therefore, user authentication may be performed based on a user ID and password input from the service search apparatus and user authentication information may be added to search attributes. This allows the user to search only for services that the user is permitted to access.

Alternatively, user authentication information may not be used for a service search but may be referred to user authentication information after the service search apparatus obtains a search result, and only a service accessible to the user may be displayed as a search result. In this case, the search result must include information about users available for each service.

A search may be performed without using user authentication information and authentication may be performed for a service found using user authentication information input after a search result is obtained. If the authentication fails, the service may be hidden or grayed out so that the user cannot select the service.

Other Embodiments

An embodiment of the present invention has been described above. However, the present invention is not limited to a service search apparatus formed by a single device. The present invention can also be applied to a service search system consisting of multiple devices.

The present invention can also be achieved by providing a program that implements the functions of the embodiment described above directly or remotely to a system or an apparatus to allow the system or apparatus to read and execute the program code provided. The program code itself installed in a computer in order to implement the functions and processes of the present is also included in the technical scope of the present invention.

In that case, the program may be in any form that has functions of a program, such as an object code, a program executed by an interpreter, or script data to be provided to an OS.

Examples of the recording media for providing the program include a floppy (registered trademark) disk, hard disk, optical disk, magneto-optical disk, MO, CD-ROM, CD-R, CD-RW, magnetic tape, non-volatile memory card, ROM, and DVD (DVD-ROM and DVD-R).

Alternatively, a browser of a client PC may be used to access a site on the Internet to download a program itself according to the present invention or a file including a program according to the present invention to a recording medium such as a hard disk. Furthermore, the program code constituting the program of the present invention may be divided into a plurality of files. The files may be downloaded from different Web pages. In other words, the present invention also includes a WWW server from which multiple users can download the program that implements the functions and processing of the present invention on computers. The program according to the present invention can be encrypted, stored on a storage medium such as a CD-ROM, and delivered to a user. Users who meet predetermined requirements may be allowed to download key information for decrypting the program from a Web page through the Internet, and then the users may use the key information to execute the encrypted program and install it to a computer.

The functions of the embodiments described above can also be implemented by processing by an OS running on a computer which performs part or all of actual processing of the embodiments in accordance with instructions of the program.

The present invention also includes a case where a program according to the present invention is written in a memory provided in a function extension unit of a PC and a CPU provided in the function extension unit executes all or part of actual processing.

According to the present invention, a user can readily search for and use a service.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-294659 filed on Oct. 30, 2006, which is hereby incorporated by reference herein in its entirety.

What is claimed is:

1. An information processing method comprising the steps of:
   receiving an input of information indicating a data transmission service;
   receiving an input of a data transmission destination;
   determining a data transfer protocol associated with the inputted data transmission destination; and
   searching a network for a service providing device capable of performing the data transmission service to the inputted data transmission destination according to the determined data transfer protocol, the determined data transfer protocol being a criterion for the searching, and the service providing device being different than the inputted data transmission destination,
   wherein said steps are implemented at least in part by a computer.

2. The information processing method according to claim 1, wherein, in the determining step, a conversion table to convert the data transmission destination to the data transfer protocol is used.

3. The information processing method according to claim 1, wherein, in the determining step, an inquiry of an external system about the data transfer protocol is performed.

4. The information processing method according to claim 1, wherein, in the searching step, a search history for the inputted data transmission destination to search for a service providing device is referred.

5. The information processing method according to claim 1, wherein the receiving step receives the input of the data transmission destination from an address book, and the determining step determines the data transfer protocol associated with the inputted data transmission destination in the address book.

6. The information processing method according to claim 1, wherein, if a telephone number as the data transmission destination is input, the data transfer protocol is FAX.

7. The information processing method according to claim 1, wherein, if an E-mail address as the data transmission destination is input, the data transfer protocol is Internet FAX or E-mail.

8. The information processing method according to claim 1, further comprising the steps of:
   displaying at least one service providing device meeting the criterion as a result of the searching;
   receiving a selection of a service providing device from the displayed service providing device(s); and
   instructing the selected service providing device to perform the data transmission service to the inputted data transmission destination in response to receiving the selection of the service providing device from the displayed service providing device(s).

9. An information processing system comprising:
   a computer;
   an input unit configured to receive (a) an input of information indicating a data transmission service, and (b) an input of a data transmission destination;
   a determining unit configured to determine a data transfer protocol associated with the inputted data transmission destination; and
   a search unit configured to search a network for a service providing device capable of performing the data transmission service to the inputted data transmission destination according to the determined data transfer protocol, the determined data transfer protocol being a criterion for the search, and the service providing device being different than the inputted data transmission destination,
   wherein said units are implemented at least in part by the computer.

10. A non-transitory computer readable storage medium encoded with a computer-executable program that, when executed by a computer system, causes the computer system to perform an information processing method comprising the steps of:
   receiving an input of information indicating a data transmission service;
   receiving an input of a data transmission destination;
   determining a data transfer protocol associated with the inputted data transmission destination; and
   searching a network for a service providing device capable of performing the data transmission service to the inputted data transmission destination according to the determined data transfer protocol, the determined data transfer protocol being a criterion for the searching, and the service providing device being different than the inputted data transmission destination.

11. An information processing method comprising the steps of:
   receiving an input of information indicating a data transmission service;

receiving an input of a data transmission destination;
determining a data transfer method according to the inputted data transmission destination;
searching for a service providing device capable of performing the data transmission service according to the determined data transfer method; and
causing the searched service providing device to transmit inputted data to the inputted data transmission destination,
wherein said steps are implemented at least in part by a computer.

12. An information processing system comprising:
a computer;
an input unit configured to receive (a) an input of information indicating a data transmission service, and (b) an input of a data transmission destination;
a determining unit configured to determine a data transfer method according to the inputted data transmission destination;
a search unit configured to search for a service providing device capable of performing the data transmission service according to the determined data transfer method; and
a control unit configured to cause the searched service providing device to transmit inputted data to the inputted data transmission destination,
wherein said units are implemented at least in part by the computer.

* * * * *